(12) United States Patent
Benedetti

(10) Patent No.: US 8,061,501 B2
(45) Date of Patent: Nov. 22, 2011

(54) SYSTEM FOR CONVEYING AND SELECTING FRUIT AND VEGETABLE PRODUCTS

(75) Inventor: Angelo Benedetti, Lugo (IT)

(73) Assignee: Unitec S.p.A., Lugo (IT)

( * ) Notice: Subject to any disclaimer, the term of this patent is extended or adjusted under 35 U.S.C. 154(b) by 397 days.

(21) Appl. No.: 12/162,141

(22) PCT Filed: Aug. 3, 2007

(86) PCT No.: PCT/EP2007/058080
§ 371 (c)(1),
(2), (4) Date: Jul. 25, 2008

(87) PCT Pub. No.: WO2008/022899
PCT Pub. Date: Feb. 28, 2008

(65) Prior Publication Data
US 2009/0159401 A1    Jun. 25, 2009

(30) Foreign Application Priority Data
Aug. 24, 2006   (EP) ..................... 06425597

(51) Int. Cl.
*B65G 17/32* (2006.01)
(52) U.S. Cl. .................. 198/387; 198/385; 209/545

(58) Field of Classification Search .................. 198/385, 198/387; 209/912, 919, 545, 701
See application file for complete search history.

(56) References Cited

U.S. PATENT DOCUMENTS

| | | | | |
|---|---|---|---|---|
| 3,794,161 | A | * | 2/1974 | Peterson .................. 209/540 |
| 4,726,898 | A | | 2/1988 | Mills et al. |
| 5,190,137 | A | * | 3/1993 | Tas ................. 198/387 |
| 6,148,989 | A | * | 11/2000 | Ecker ............. 198/387 |
| 6,179,129 | B1 | | 1/2001 | Powell, Jr. |
| 7,228,958 | B2 | * | 6/2007 | Hendrik De Greef ........ 198/385 |

FOREIGN PATENT DOCUMENTS

| | | |
|---|---|---|
| EP | 0105114 | 4/1984 |
| EP | 0319239 | 6/1989 |
| WO | 01/16003 | 3/2001 |

* cited by examiner

*Primary Examiner* — James R Bidwell
(74) *Attorney, Agent, or Firm* — Shoemaker and Mattare

(57) ABSTRACT

A conveyor line for fruit or vegetables has a plurality of rollers defining seats for the products therebetween. At a selection station, a first member detects at least one feature of the product, and at a sorting station, a second member diverts similar products toward the same destination. Upstream of the selection station, the direction of rotation of the rollers is controlled to cause each product to settle correctly in its seat or shift into an adjacent seat, so that during detection of the features of the products, the products remain properly seated.

4 Claims, 1 Drawing Sheet

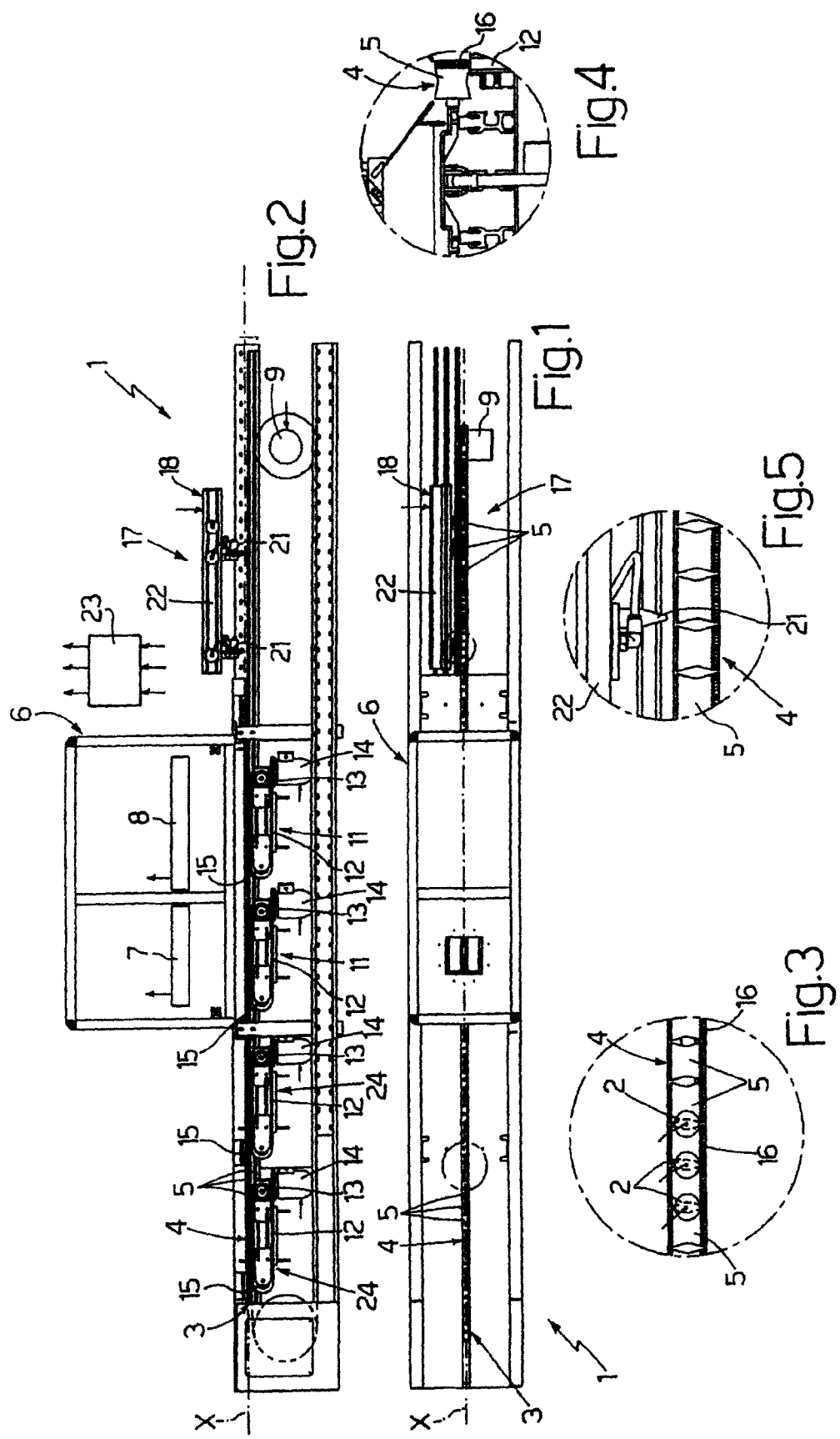

_US 8,061,501 B2_

SYSTEM FOR CONVEYING AND SELECTING FRUIT AND VEGETABLE PRODUCTS

FIELD OF THE INVENTION

The present invention relates to a system for conveying and selecting fruit and vegetable products.

BACKGROUND OF THE INVENTION

Systems for conveying and selecting fruit and vegetable products comprise a loading station where a predetermined quantity of products is placed on a conveyor belt, a singularization station of the products where the products are aligned on a conveyor belt defined by rollers so that each product is caused to occupy a corresponding housing seat defined between two adjacent rollers, a selection station where the features of the product, such as dimensions and colour, are detected, a station in which the products are sent towards the corresponding packaging stations depending on the detected features. For certain small-sized fruit and vegetable products provided with a footstalk, such as cherries and certain types of tomatoes, the products may turn during the step in which the aforesaid features are detected along the conveyor belt installed in the selection station. Now, during such rotation, often due to the incorrect position the product may take in its housing seat, it may occur that either the product itself may jump into a previous seat or into the following seat, or the presence of the footstalk may prevent the complete rotation according to the direction of rotation imposed to the product itself. In this case, in the following station, which as mentioned is that in which the products are sorted according to their features, incorrect sorting may occur, that is, a product with certain features may either be sent to a station in which products with different features are packed or may not be entirely analyzed.

SUMMARY OF THE INVENTION

It is the object of the present invention to provide a system for conveying and selecting fruit and vegetable products which is free from the drawbacks mentioned above.

According to the present invention, there is provided a system for conveying and selecting fruit and vegetable products comprising:
a conveyor line defined by a plurality of rollers in which housing seats for the product are determined between adjacent rollers;
a selection station in which at least one first member detects at least one feature of said product; and
a station in which by means of a second member, the products with the same features are sorted towards the same destination;
characterized in that upstream of said selection station there is installed at least one first assembly adapted to determine the rotation of said rollers so that said product accommodated in its seat may either correctly settle in such a seat or jump into an adjacent seat.

BRIEF DESCRIPTION OF THE DRAWINGS

The present invention will now be described with reference to the accompanying drawings illustrating a preferred embodiment, in which:
FIG. 1 is a plan view of a system constructed according to the dictates of the present invention;
FIG. 2 is a front view of the system in FIG. 1;
FIG. 3 is a magnified plan view of a first detail of the system in FIG. 1;
FIG. 4 is a magnified side view of the first detail shown in FIG. 3; and
FIG. 5 is a magnified plan view of second detail of the system in FIG. 1.

DETAILED DESCRIPTION OF THE INVENTION

In FIGS. 1 and 2, number 1 indicates a system as a whole adapted to convey and select fruit and vegetable products 2 (FIG. 3) comprising a conveyor line 3 for products 2 along a horizontal axis X. Such a conveyor line 3 is defined by a looped chain 4 actuated by means of an electrical motor displaying a plurality of rollers 5 idly mounted so as to turn about their rotation axis. As shown in FIGS. 3 and 4, rollers 5 display a central part having reduced thickness with respect to the end parts so that such a central part along with the central part of adjacent roller 5 define the housing seat of one product 2 only.

With reference to FIGS. 1 and 2, along conveyor line 3, system 11 is provided with a selection station 6 of products 2 of the known type, which is therefore schematically shown. Such a station 6 comprises a first member 7 adapted to detect at least one first feature of product 2 which passes underneath and a second member 8 adapted to detect at least one second feature of product 2 which passes underneath. The detected features may be the size, the weight, the colour and/or the sugar content degree of product 2. During the step in which the aforesaid features are detected, products 2 are turned clockwise at a member 7 or 8 and anticlockwise at the other member 8 or 7. To determine such a rotation of product 2 under each block 7 and 8, a respective assembly 11 is provided, which controls the rotation of rollers 5 when these are at and underneath members 7 and 8. Assemblies 11 are known and for the sake of simplicity they are schematically shown. Each assembly 11 comprises a belt 12 wound as a loop around a drive wheel 13 actuated by an electric motor 14 and around an idle wheel 15. An axial end 16 of roller 5, which is provided with an annular toothing for a better grip on belt 12, is in contact with the upper part of belt 12 (FIG. 4). Preferably, the number of rollers 5 engaged on belt 12 is higher than 6 or 7 units.

A sorting station 17 for products 2 is provided in sequence to selection station 6. Such a station 17 is of the known type and it is therefore schematically shown. In any case, a member 18 is installed in such a station 17 comprising a plurality of nozzles 21 (FIG. 5) carried by a bar 22, arranged by the side of the conveyor line 3 and adapted to blow air towards the seat of product 2, which as mentioned is defined by two adjacent rollers 5 so as to make product 2 drop onto a conveyor belt or into a container underneath (not shown). System 1 also comprises an electronic control unit 23 which manages conveyor line 3 and all of the stations in system 1.

The main feature of the present invention consists in that at least one assembly 24 similar to assembly 11 is installed upstream of station 6 along the conveyor line 3. As shown in FIG. 2, there are preferably two assemblies 24 controlled by control unit 23. A first assembly 24 determines the clockwise rotation of rollers 5 and the second assembly 24 determines the anticlockwise rotation of rollers 5 with the notice that assembly 24 closest to station 6 determines the rotation of rollers 5 in the opposite direction to that determined by the first assembly 11 installed in station 6. The components of assemblies 24 for the sake of simplicity are shown with the same numerals as assemblies 11.

In use, during the conveyance of products 2 along line 3, products 2 at first encounter assembly 24 which determines, for example, the clockwise rotation of rollers 5 so as to turn product 2 present in the seat defined between two adjacent rollers 5. Such a rotating step of the products 2 allows to either arrange itself correctly, that is in the central part of its seat, or to jump into an adjacent seat if the product 2 is not correctly arranged in its seat. Then, products 2 meet the second group 24 which determines the rotation of rollers 5 in the opposite direction with respect to that defined by the previous assembly 24. In this step as well, for products 2 which have either jumped into another seat during the previous step or are not yet correctly positioned in their seat, the rotation of rollers 5 determines a rotation of products 2 which are therefore caused to settle correctly in their seat. After these settling steps for products 2 in the corresponding seats, the same products 2 are forwarded to station 6 where at first they meet the first assembly 11 which, during detection of at least one feature of product 2, determines the clockwise rotation of rollers 5 and thus the consequent rotation of product 2. Then, product 2 meets the second assembly 11 which, again during the detection of at least one second feature of product 2, determines the anticlockwise rotation of rollers 5 and thus the consequent rotation of product 2. Control unit 23 is adapted to store the detected features of products 2 in each seat in order to activate member 18 so that products 2 with the same features are sorted towards the same destination.

The advantages achieved by the embodiment of the present invention are apparent from the description above.

In particular, a system 1 is constructed which determines the settling of products 2 in their seat well before the selection station so that during the detection of the features of products 2, the product does not jump into an adjacent seat thus distorting such detection.

It is finally apparent that changes and variants can be made to system 1 described and shown herein without departing from the protective scope of the present invention.

The invention claimed is:

1. A system for conveying and selecting fruit and vegetable products comprising:
   a conveyor line defined by a plurality of rollers in which housing seats for the product are determined between adjacent rollers;
   a selection station in which at least one first member detects at least one feature of said product; and
   a station in which by means of a second member, the products with the same features are sorted towards the same destination;
   wherein upstream of said selection station there is installed at two of said first assemblies, each adapted to determine the rotation of said rollers so that said product accommodated in its seat may either correctly settle in such a seat or jump into an adjacent seat,
   wherein one of said first assemblies is adapted to determine the rotation of said rollers in a predetermined direction and the other is adapted to determine the rotation of said rollers in the opposite direction.

2. A system according to claim 1, wherein said first assembly comprises a belt actuated by drive means and adapted to mesh with a portion of said roller so as to determine the rotation of the latter around its rotation axis.

3. A system for conveying and selecting fruit and vegetable products comprising:
   a conveyor line defined by a plurality of rollers in which housing seats for the product are determined between adjacent rollers;
   a selection station in which at least one first member detects at least one feature of said product; and
   a station in which by means of a second member, the products with the same features are sorted towards the same destination;
   wherein upstream of said selection station there is installed at least one first assembly adapted to determine the rotation of said rollers so that said product accommodated in its seat may either correctly settle in such a seat or jump into an adjacent seat,
   wherein said selection station is provided with a second assembly adapted to determine, during the detection of said feature, the rotation of said rollers in a direction opposite to that determined by said first assembly immediately before said selection station.

4. A system for conveying and selecting fruit and vegetable products comprising:
   a conveyor line defined by a plurality of rollers in which housing seats for the product are determined between adjacent rollers;
   a selection station in which at least one first member detects at least one feature of said product; and
   a station in which by means of a second member, the products with the same features are sorted towards the same destination;
   wherein upstream of said selection station there is installed at least one first assembly adapted to determine the rotation of said rollers so that said product accommodated in its seat may either correctly settle in such a seat or jump into an adjacent seat,
   wherein said first assembly comprises a belt actuated by drive means and adapted to mesh with a portion of said roller so as to determine the rotation of the latter around its rotation axis.

\* \* \* \* \*